United States Patent
Werner et al.

(10) Patent No.: US 10,785,867 B2
(45) Date of Patent: Sep. 22, 2020

(54) AUTOMATIC DETERMINATION OF POWER PLANE SHAPE IN PRINTED CIRCUIT BOARD

(71) Applicant: International Business Machines Corporation, Armonk, NY (US)

(72) Inventors: John S. Werner, Fishkill, NY (US); Matteo Cocchini, Long Island City, NY (US); Zachary T. Dreiss, Beacon, NY (US); Nicholas G. Danyluk, Long Island City, NY (US); Edward N. Cohen, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/140,611

(22) Filed: Sep. 25, 2018

(65) Prior Publication Data
US 2020/0100354 A1    Mar. 26, 2020

(51) Int. Cl.
*H05K 1/02* (2006.01)
*G06F 30/394* (2020.01)
*G06F 119/06* (2020.01)

(52) U.S. Cl.
CPC .......... *H05K 1/029* (2013.01); *G06F 30/394* (2020.01); *H05K 1/0262* (2013.01);
(Continued)

(58) Field of Classification Search
CPC .............. G06F 17/5045; G06F 17/5077; G06F 17/5081; G06F 2217/02; G06F 2217/06;
(Continued)

(56) References Cited

U.S. PATENT DOCUMENTS 4,659,425 A * 4/1987 Eggers ................ B32B 37/1027
216/20
5,162,728 A * 11/1992 Huppenthal ......... G01R 31/316
324/756.03
(Continued)

OTHER PUBLICATIONS

Loughhead, Phil "An Introduction to Topological Autorouting", Online Documentation for Altium Products, Apr. 25, 2017, pp. 1-19.
(Continued)

*Primary Examiner* — Helen Rossoshek
(74) *Attorney, Agent, or Firm* — Cantor Colburn LLP; Teddi Maranzano

(57) ABSTRACT

A system and method to automatically determine power plane shape in a printed circuit board (PCB) involve obtaining inputs. The inputs include a size and shape of the PCB, a set of sources, and a set of sinks associated with a power plane. The method also includes determining a center of charge (CoC) as a center of largest current density for the set of sources and the set of sinks, and creating a sub-shape corresponding with a path from each source of the set of sources and from each sink of the set of sinks to the CoC. The creating the sub-shape includes determining a width of a conductor in the path corresponding with each of the sub-shapes. The sub-shapes created for the set of sources and the set of sinks are combined as the power plane shape.

19 Claims, 7 Drawing Sheets

(52) U.S. Cl.
CPC .... *G06F 2119/06* (2020.01); *H05K 2201/093* (2013.01); *H05K 2201/09345* (2013.01)

(58) Field of Classification Search
CPC .. G06F 2217/12; G06F 2217/78; G06F 30/39; G06F 30/394; G06F 2119/06; Y10T 29/49156; Y10T 29/49117; H05K 1/029; H05K 1/0265; H05K 2201/093; H05K 2201/09663; H05K 2201/0969; H05K 2201/0195; H05K 3/4623; H05K 1/0224; H05K 1/0263; H05K 1/0262; H05K 3/0005; H05K 2201/09345
See application file for complete search history.

(56) References Cited

U.S. PATENT DOCUMENTS

| | | | | |
|---|---|---|---|---|
| 5,708,569 | A * | 1/1998 | Howard | H05K 1/162 |
| | | | | 361/760 |
| 5,736,796 | A | 4/1998 | Price et al. | |
| 5,912,809 | A * | 6/1999 | Steigerwald | H05K 1/0262 |
| | | | | 174/255 |
| 6,084,779 | A | 7/2000 | Fang | |
| 6,525,622 | B1 * | 2/2003 | Novak | H05K 1/0231 |
| | | | | 333/12 |
| 6,557,154 | B1 * | 4/2003 | Harada | G06F 17/5036 |
| | | | | 174/260 |
| 6,799,306 | B2 * | 9/2004 | Araki | G06F 30/394 |
| | | | | 716/112 |
| 6,846,992 | B2 | 1/2005 | Amparan et al. | |
| 6,903,634 | B2 * | 6/2005 | Chang | H01P 7/082 |
| | | | | 333/235 |
| 7,124,390 | B2 | 10/2006 | Smith et al. | |
| 7,376,914 | B2 * | 5/2008 | Douriet | G06F 17/5045 |
| | | | | 716/127 |
| 7,765,673 | B2 * | 8/2010 | Fauh | H05K 1/0265 |
| | | | | 29/593 |
| 7,797,663 | B2 * | 9/2010 | Bird | G01R 31/2818 |
| | | | | 716/137 |
| 7,873,933 | B2 * | 1/2011 | Harrer | H05K 1/0265 |
| | | | | 29/847 |
| 8,355,258 | B2 * | 1/2013 | Osaka | H05K 3/0005 |
| | | | | 174/260 |
| 8,875,086 | B2 * | 10/2014 | Verghese | G06F 17/5036 |
| | | | | 307/104 |
| 9,183,345 | B2 | 11/2015 | Lin et al. | |
| 9,468,090 | B2 * | 10/2016 | Sabavat | H05K 1/0224 |
| 9,600,619 | B2 * | 3/2017 | Chen | G06F 17/5072 |
| 9,767,242 | B1 | 9/2017 | Balsdon | |
| 10,546,089 | B1 * | 1/2020 | Cocchini | G06F 30/39 |
| 2003/0188890 | A1 * | 10/2003 | Bhatt | H05K 3/445 |
| | | | | 174/262 |
| 2003/0223208 | A1 | 12/2003 | Wu et al. | |
| 2004/0207989 | A1 * | 10/2004 | Fauh | H05K 1/0265 |
| | | | | 361/780 |
| 2005/0022149 | A1 * | 1/2005 | Smith | G06F 30/39 |
| | | | | 716/120 |
| 2008/0222593 | A1 * | 9/2008 | Fujimori | G06F 30/39 |
| | | | | 716/137 |
| 2008/0295041 | A1 * | 11/2008 | Zhou | H05K 1/0262 |
| | | | | 716/132 |
| 2010/0030513 | A1 | 2/2010 | Tsai | |
| 2010/0138802 | A1 * | 6/2010 | Kobayashi | G06F 30/394 |
| | | | | 716/120 |
| 2012/0206889 | A1 * | 8/2012 | Norman | H01L 23/50 |
| | | | | 361/761 |
| 2012/0261175 | A1 * | 10/2012 | Huang | H05K 1/0265 |
| | | | | 174/261 |
| 2013/0021739 | A1 * | 1/2013 | Kim | H05K 1/0227 |
| | | | | 361/679.31 |
| 2015/0073768 | A1 * | 3/2015 | Kurs | G06F 17/5036 |
| | | | | 703/13 |
| 2015/0324507 | A1 * | 11/2015 | Takami | G06F 17/5081 |
| | | | | 716/107 |
| 2016/0128183 | A1 * | 5/2016 | Matsumoto | H05K 1/0224 |
| | | | | 174/250 |
| 2016/0261179 | A1 * | 9/2016 | Blanchard | H01F 27/2804 |
| 2016/0342724 | A1 * | 11/2016 | Chen | H05K 3/0005 |

OTHER PUBLICATIONS

Loyer, Jeff "Optimising PDNs can save design real estate and board layers", Design Automation, Apr. 20, 2016, pp. 1-8.

* cited by examiner

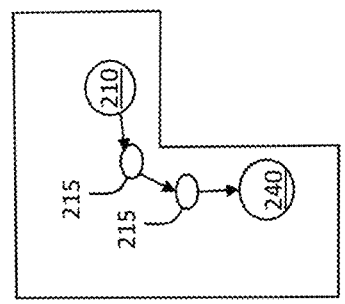
FIG. 5D
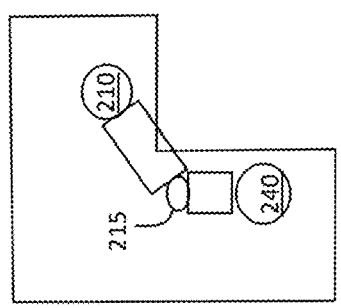
FIG. 5C
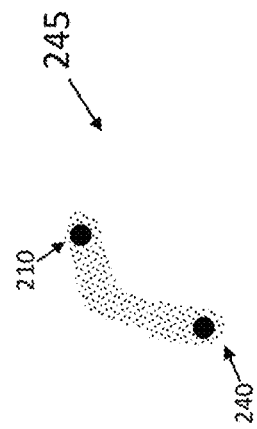
FIG. 5F
FIG. 5B
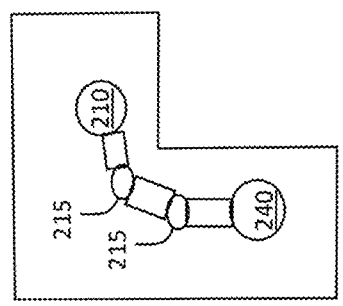
FIG. 5E
FIG. 5A
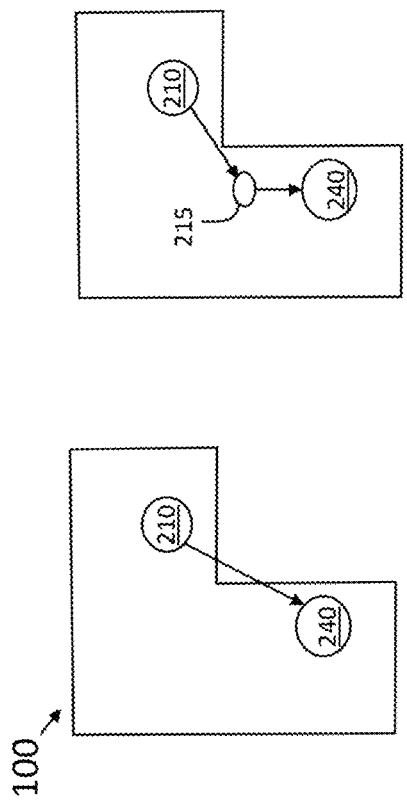

AUTOMATIC DETERMINATION OF POWER PLANE SHAPE IN PRINTED CIRCUIT BOARD

BACKGROUND

The present invention relates to printed circuit boards, and more specifically, to an automatic determination of a power plane shape in a printed circuit board.

A printed circuit board (PCB) is a collection of interconnected electrical components for use in any number of electrical products. A multi-layer PCB facilitates increased component density. In a multi-layer PCB, each layer includes an insulating material with a conductor (e.g., copper) patterned into conductive lines, traces, and pads for connections to components. Two or more layers of a multi-layer PCB are typically dedicated as power supply and ground planes. The power supply plane(s), also referred to as power plane(s), supply direct current (DC) power to circuits mounted on other layers through vias, which are copper-plated holes that function as electrical tunnels. Typically, after the components are placed such that the locations of the component vias are known, the power plane is manually drawn. This approach can lead to inefficiencies that result from the power plane being larger than necessary.

SUMMARY

Embodiments of the present invention are directed to systems and methods to automatically determine power plane shape in a printed circuit board (PCB). The method includes obtaining inputs. The inputs include a size and shape of the PCB, a set of sources, and a set of sinks associated with a power plane. The methods also includes determining a center of charge (CoC) as a center of largest current density for the set of sources and the set of sinks, and creating a sub-shape corresponding with a path from each source of the set of sources and from each sink of the set of sinks to the CoC. The creating the sub-shape includes determining a width of a conductor in the path corresponding with each of the sub-shapes. The sub-shapes created for the set of sources and the set of sinks are combined as the power plane shape.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

FIGS. 5A through 5F illustrate processes involved in automatically determining power plane shape in a PCB according to one or more embodiments of the invention;

DETAILED DESCRIPTION

As previously noted, a multi-layer PCB includes one or more dedicated power planes to supply power to components (i.e., sinks). The supply can be directly to a pin on the same layer or to another layer through a via. As also noted, the manual determination of a power plane shape can result in the power plane being larger than necessary. This can lead to the need for holes in the power plane for signal vias or vias at different voltage potentials that create undesired impedance. The larger size of the power plane can also prevent multiple power domains from being placed on the same layer resulting in additional layers, thus increasing cost. A prior approach to improving the efficiency of the power plane shape involves automatically traversing a straight-line path between each source (e.g., connector, voltage regulator) and sink (e.g., component pin, via location) on the power plane with a series of squares and shaping the power plane based on the various paths. Each series of squares defining a path is a sub-shape, and the sub-shapes are combined to define the power plane shape. Obstacles between a given source and sink are avoided by routing the set of squares around the obstacles. Exemplary obstacles include components (e.g., other sources or sinks, connectors, processors, integrated circuits) or voids in the board layer (e.g., mounting holes). The size of the squares and the number of squares are calculated for a given fixed width and thickness of the conductor (e.g., copper). Embodiments of the systems and methods detailed herein relate to an automatic determination of power plane shape in a PCB. Specifically, the prior approach is further improved by calculating a width for the conductor rather than using a fixed width and considering obstacles prior to charting each path between a source and sink on the power plane rather than merely avoiding encountered obstacles as the series of squares is placed.

Figure 1:
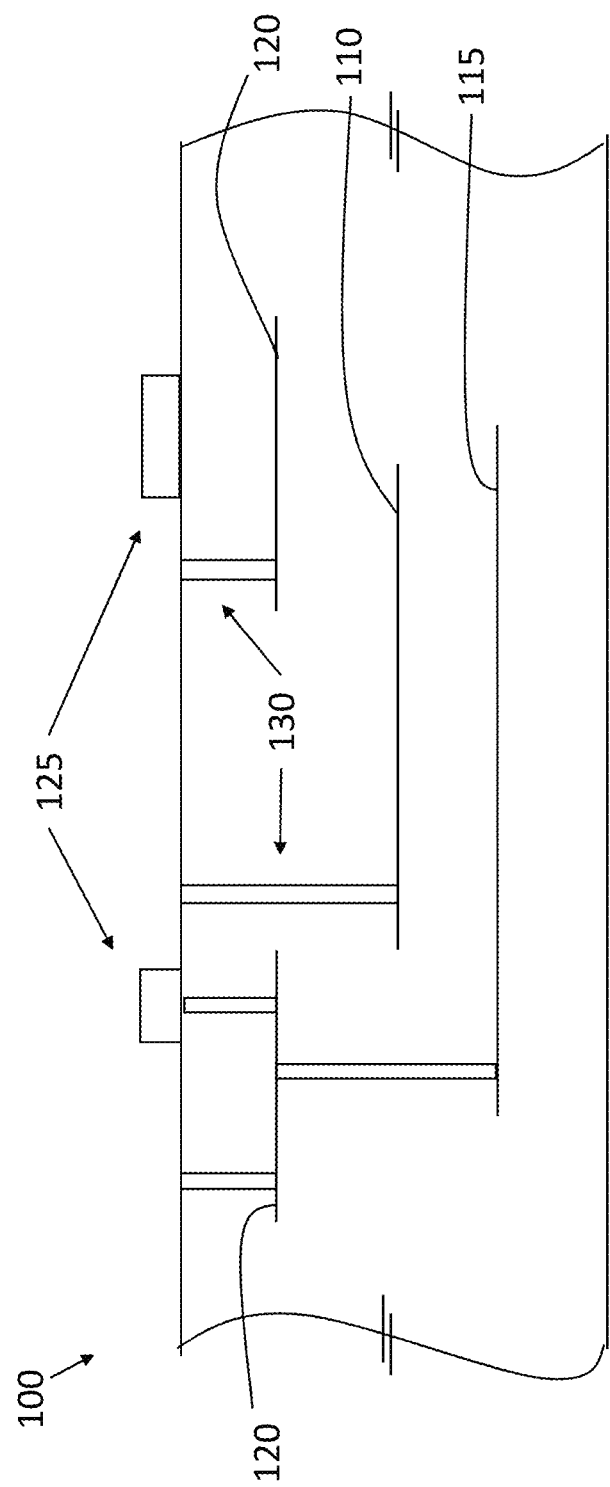
FIG. 1 is a cross-sectional view of an exemplary multi-layer printed circuit board (PCB) resulting from automatic determination of power plane shape according to one or more embodiments of the invention.

FIG. 1 is a cross-sectional view of an exemplary multi-layer PCB 100 resulting from automatic determination of power plane shape according to one or more embodiments of the invention. The exemplary PCB 100 is shown with one power plane 110 and one ground plane 115, but additional power planes 110 or ground planes 115 are contemplated according to alternate embodiments of the invention. Signal trace layers 120, components 125, and vias 130 are also shown. According to embodiments detailed with reference to FIGS. 2 and 3, the shape of the power plane 110 is automatically determined.

Figure 2:
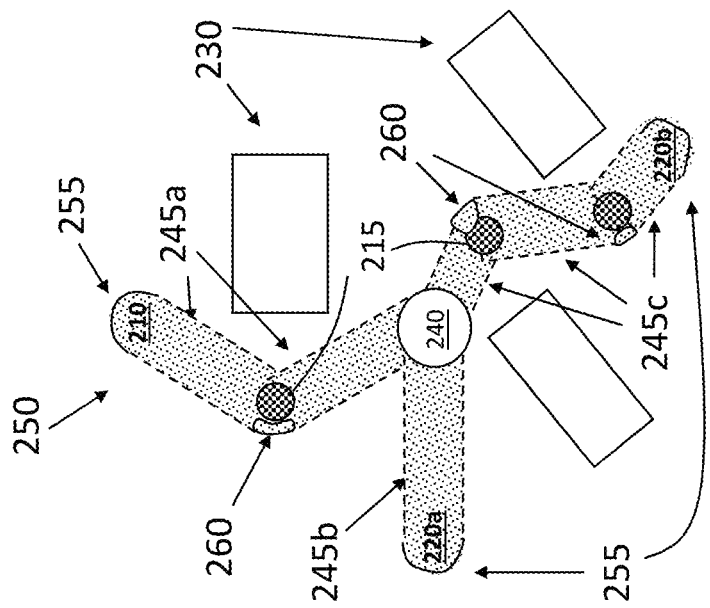
FIG. 2 shows an exemplary power plane shape determined automatically according to one or more embodiments of the invention.
Figure 2:
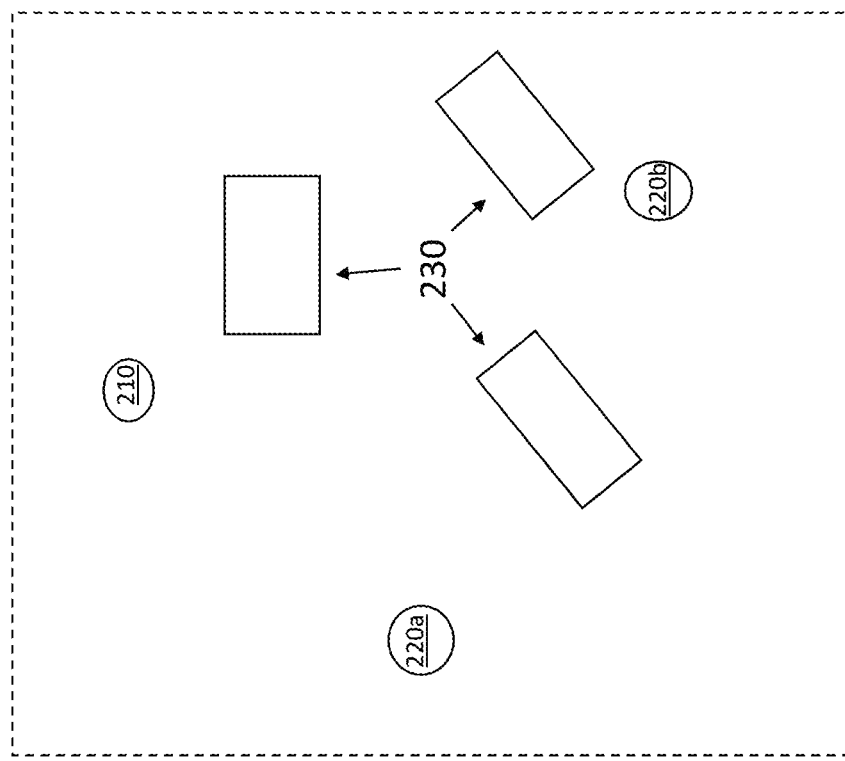

FIG. 2 shows an exemplary power plane shape 250 determined automatically according to one or more embodiments of the invention. A source 210 and two sinks 220a, 220b (generally referred to as 220) are shown along with three obstacles 230. The dashed line indicates a power plane shape that may be determined manually according to a conventional approach. On the right, an exemplary power plane shape 250 determined automatically according to embodiments of the invention is shown. As detailed with reference to FIG. 3, a center of charge (CoC) 240 or center of current density is determined. This is the location where the largest distribution of current converges. The CoC 240 can be determined in a number of ways including, for example, a Gaussian distribution. There can be multiple centers of current density due to the distribution of charge between a source 210 and two or more sinks 220, for example. In addition, there can be multiple sources 210 connected in parallel on a given power plane 110.

When there are multiple centers of current density, there can be multiple CoCs 240 or a single CoC 240 can be determined as the center of largest current density, for example. By determining the one or more CoCs 240, the power plane shape 250 can be made to include the vast majority of the charge, thereby minimizing the ohmic potential (IR) drop and space utilized on the power plane 110. When there are multiple CoCs 240, there can be multiple sub-shapes 245 associated with the same component. For example, if a given sink 220 gets 75 percent of its current from a first CoC 240 and 25 percent of its current from a second CoC 240, then two sub-shapes 245 are created for that sink 220. The width W of each sub-shape 245 is determined based on its respective corresponding current, as discussed with reference to FIG. 4.

Paths in consideration of the obstacles 230 are determined from the source 210 and from each of the sinks 220 to the CoC 240, in the direction of current flow. Specifically, one or more obstacle avoidance points (OAPs) 215 are determined to avoid each obstacle 230, and the path from the source 210 or a sink 220 is subdivided into paths from the source 210 or sink 220 to an OAP 215 and ultimately from that or another OAP 215 to the CoC 240. The initial position of a given OAP 215 can be a predefined distance to a corresponding obstacle 230 based on the current that will be running through the sub-shape 245. This initial position can change, as further discussed with reference to FIG. 4. In addition, the position of a given OAP 215 is on the side of component (e.g., source 210, sink 220, previous OAP 215) that is closest to the CoC 240. The path from the source 210 or sink 220 to the CoC 240, with as many OAPs 215 as needed, defines a sub-shape 245.

In the exemplary case shown in FIG. 2, three sub-shapes 245a, 245b, 245c are determined. Sub-shape 245a includes one OAP 215 to avoid the obstacle 230 in the path from the source 210 to the CoC 240. Sub-shape 245b has no OAPs 215 between the sink 220a and the CoC 240. Sub-shape 245c has two OAPs to avoid two obstacles 230 from the sink 220b to the CoC 240. The three sub-shapes 245a, 245b, 245c are combined as the power plane shape 250. With the CoC 240 as the common point of each of the sub-shapes 245, the sub-shapes 245 are aggregated or combined. The combining includes adding a semicircle 255 around each source 210 and sink 220 and adding overlap volume 260 and smoothing, as needed to avoid sharp corners to reduce impedance. While the OAPs 215 are shown in the right in FIG. 2 for explanatory purposes, those OAPs 215 are used as guideposts or waypoints in the design of the sub-shapes 245 but do not represent a physical component.

Figure 3:
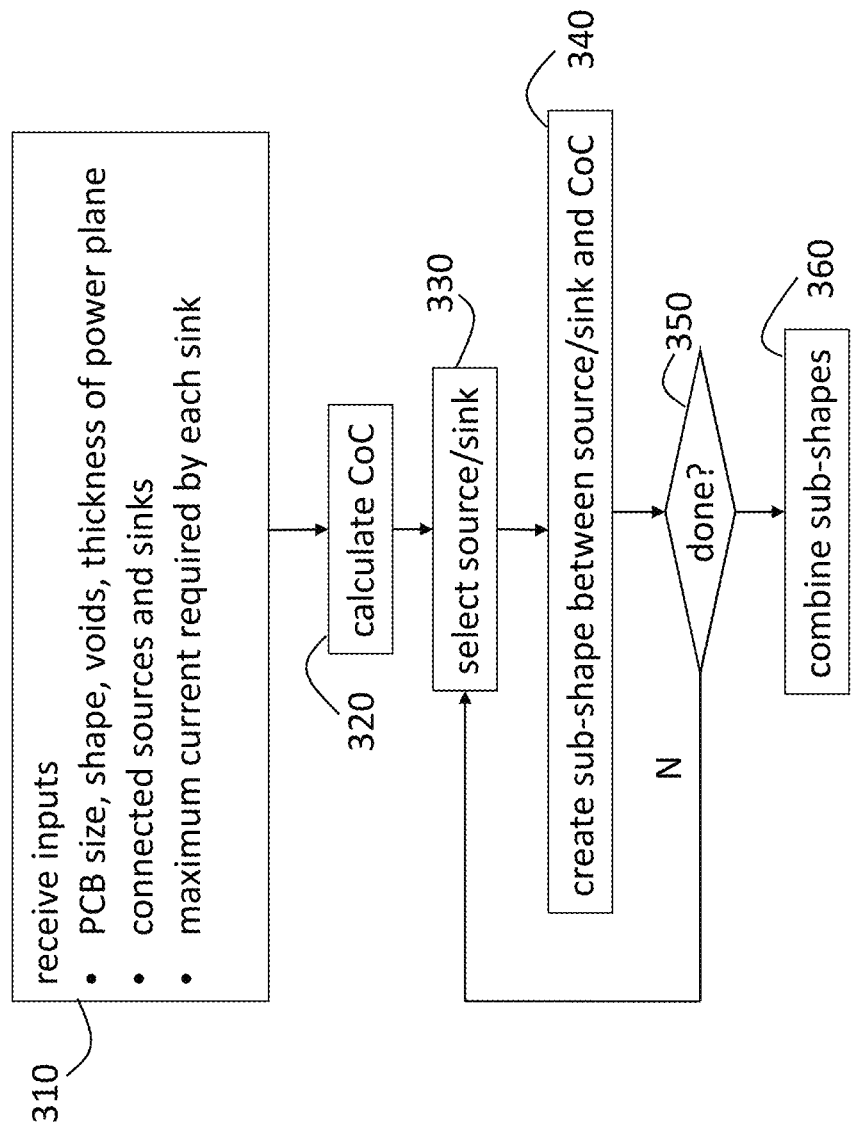
FIG. 3 is a process flow of a method of automatically determining power plane shape in a PCB according to one or more embodiments of the invention.

FIG. 3 is a process flow of a method of automatically determining power plane shape 250 in a PCB 100 according to one or more embodiments of the invention. At block 310, receiving inputs includes receiving information about the size and shape of the PCB 100, the location of voids and other obstacles 230, and the thickness (height H) of the power plane 110. The connected sources 210 and sinks 220 are also specified along with the maximum current required by each sink 220. At block 320, the processes include calculating the CoC 240 as previously discussed. At block 330, an iterative process is started to create sub-shapes 245. One of the sources 210 or sinks 220 is selected at block 330 at each iteration. Creating the sub-shape between the selected source 210 or sink 220 and the CoC 240, at block 340, is further detailed with reference to FIG. 4. At block 350, a check is done of whether the source 210 or sink 220 selected at block 330 is the last unselected component (i.e., the iterative process is done). If not, the next source 210 or sink 220 is selected at block 330 to start another iteration. If, based on the check at block 350, sub-shapes 245 have been created for all the sources 210 and sinks 220, then combining the sub-shapes, at block 360, results in the power plane shape 250.

Figure 4:
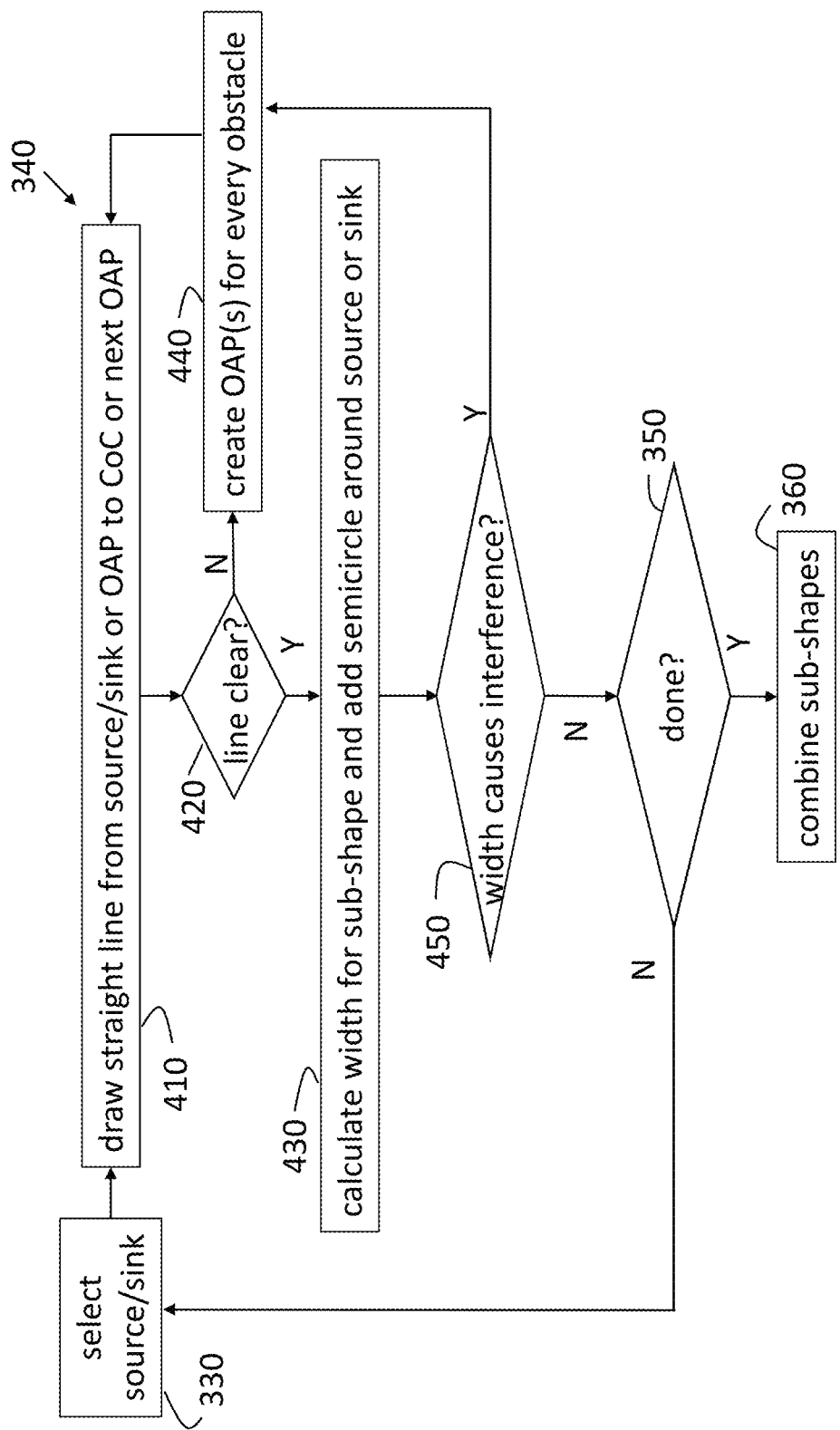
FIG. 4 is a process flow that details aspects of the sub-shape generation according to one or more embodiments of the invention.

FIG. 4 is a process flow that details aspects of the sub-shape 245 generation (at block 340) to automatically determine a power plane shape 250 in a PCB 100 according to one or more embodiments of the invention. Once a source 210 or sink is selected, at block 330, drawing a straight line from the source 210 or sink 220 or an OAP 215 to the CoC 240 or the next OAP 215, at block 410, does not involve any OAPs 215 initially. Instead, the process refers to drawing a straight line between the source 210 or sink 220 selected at block 330 and the CoC 240 calculated at block 320. A check is then done, at block 420, of whether the straight line, drawn at block 410, goes off the PCB 100 or interferes with an obstacle 230 or if, instead, the line is clear. As part of the check at block 420, it is determined if the line reaches the CoC 240, as further discussed. This additional check at block 420 is necessary when OAPs 215 are involved rather than initially, when the line is from the source 210 or sink 220 to the CoC 240. If the line is not clear, then the process at block 440 is performed to create one or more OAPs 215, iteratively, for every obstacle 230 between the source 210 or sink 220 and the CoC 240.

If the process at block 440 is reached, then the process at block 410 is repeated to draw a line to the OAP 215 created at block 440. As previously noted, this is done iteratively. That is, if one OAP 215 is created between a source 210 or sink 220 and the CoC 240, for example, then the line from the source 210 or sink 220 to the OAP 215 is checked, at block 420, during one iteration followed by the line from the OAP 215 to the CoC 240 during the next iteration. If more OAPs 215 are created at block 440 (i.e., if more iterations through the processes at blocks 410, 420, and 440 are required), then the line from the source 210 or sink 220 to the first OAP 215, lines between adjacent OAPs 215, and the line between the last OAP 215 and the CoC 240 are checked during respective iterations, at block 420. As previously noted, part of the check at block 420 is to determine not only if the line is clear but also if the line reaches the CoC 240. This additional check at block 420 ensures that the process at block 430 is not reached until all the OAPs 215 needed between the selected source 210 or sink 220 and the CoC 240 are addressed, and the line or series of lines are all clear according to the check at block 420.

At block 430, the processes include calculating a width for the sub-shape 245 (the line or series of lines from the source 210 or sink 220 to the CoC 240) and adding a semicircle 255 around the source 210 or sink 220. Calculating the width of the sub-shape 245 is based on the pre-determined maximum allowable voltage drop Vdrop for the conductor (e.g., copper) that makes up the sub-shape 245. Specifically, resistance R is first computed based on the maximum allowable voltage drop Vdrop and the desired current I to be provided by the source 210, as:

$$R = \frac{Vdrop}{I} \quad [\text{EQ. 1}]$$

Then the width W is solved from the following:

$$R = \rho \frac{L}{W*H} \quad [\text{EQ. 2}]$$

In EQ. 2, ρ is the resistivity of the conductor material (e.g., $1.7 \times 10^{-6}$ for copper), L is the length of the conductor from the source 210 or sink 220 to the CoC 240, and H is the height or thickness of the power plane 110, which is specified as an input at block 310. The semicircle 255 added around the source 210 or sink 220 has a diameter equal to the width W computed according to EQ. 2.

At block 450, a check is done of whether the width W computed at block 430 causes any interference. This is because the lines checked and passed at block 420 can fail the check at block 450 based on the width W that is determined at block 430. Specifically, a check is done of whether an obstacle 230 is within a predefined threshold distance of the line of the width W. If the line or lines determined by the iterative processes at blocks 410, 420, and 440 are determined to cause interference with (i.e., be within the threshold distance of) obstacles 230 based on the width W computed at block 430, then the iterative process at block 440 is initiated again. One or more OAPs 215 are determined or existing OAPs 215 are shifted, based on a line of the width W and the amount of interference with obstacles 230. Iteratively, as needed, lines from the source 210 or sink 220 that use the OAPs 215 as waypoints are determined, at block 410. The line or lines are checked at block 420 and, a new width is calculated at block 430, as needed, based on the change in length L caused by the additional OAPs 215. That is, the processes at block 430 are repeated for the series of lines from the source 210 or sink 220 to the CoC 240.

When the check at block 450 indicates that the sub-shape 245 is complete (i.e., one or more lines from the selected source 210 or sink 220 with a calculated width W reach the CoC 240 without interfering with obstacles 230), then a check is done at block 350 of whether the sub-shape 245 is the last sub-shape 245. That is, the check at block 350 determines if every source 210 and sink 220 has been addressed. If not, then the iterative process restarts, at block 330, with selecting an as-yet unselected source 210 or sink 220. If every source 210 and sink 220 has been selected according to the check at block 350, then combining the sub-shapes 245, at block 360, results in the power plane shape 250. As noted with reference to FIG. 2, combining the sub-shapes 245, at block 360, includes adding overlap volume 260, as needed, to fill and smooth out the meeting points of the rectangular shapes within and among the sub-shapes 245 to reduce impedance that would exist if any sharp turns in the adjacent rectangular shapes were not accounted for.

FIGS. 5A through 5F illustrate processes detailed with reference to FIGS. 3 and 4. FIG. 5A shows a source 210 and CoC 240 on a PCB 100. Based on the source 210 being selected at block 330, a straight line is drawn from the source 210 to the CoC 240, according to the processes at block 410. However, a check at block 420 would indicate that the line from the source 210 to the CoC 240 is not clear (i.e., the line goes off the PCB 100). FIG. 5B shows an OAP 215 that is created according to the processes at block 440. Assuming that the line from the source 210 to the OAP 215 to the CoC 240 is clear according to the check at block 420, the width W is computed at block 430. FIG. 5C shows that the width W causes the connection from the source 210 to the OAP 215 to be off the PCB 100.

Thus, based on failing the check at block 450, the process at block 440 is reached, and another OAP 215 is created. FIG. 5D shows the lines from the source 210 to the first OAP 215 to the second OAP 215 to the CoC 240. Because these lines are clear, according to a check at block 420, the width W is calculated for this new length of the sub-shape 245 at block 430. FIG. 5E shows the result of the new width W calculation. The check at block 450 is passed, and the sub-shape 245 shown in FIG. 5F results.

Figure 6:
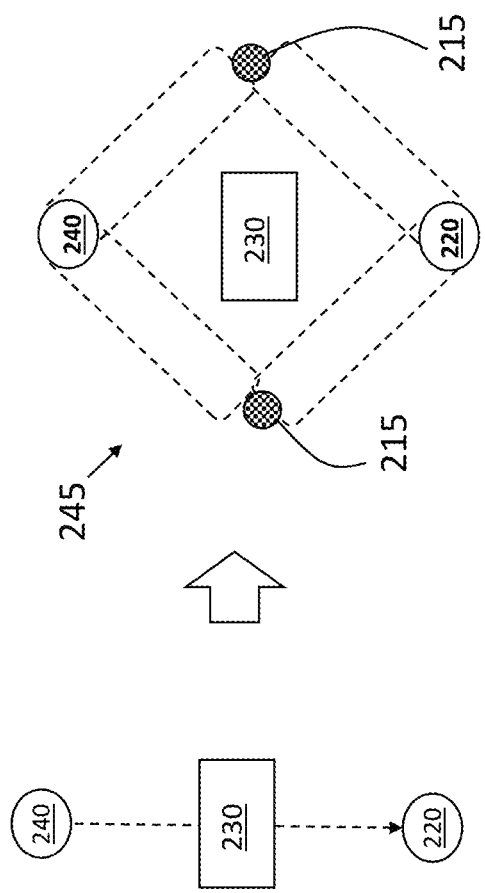
FIG. 6 illustrates another exemplary sub-shape that is created according to one or more embodiments of the invention.

FIG. 6 illustrates another exemplary sub-shape 245 that is created according to one or more embodiments of the invention. In the exemplary case shown in FIG. 6, a line from the CoC 240 to a sink 220 encounters an obstacle 230. This results in the sub-shape 245 that includes two OAPs 215 and two paths between the CoC 240 and sink 220. This exemplary case illustrates that more than one path can form a sub-shape 245. In the example, a single path on either side of the obstacle 230 can have failed because the computed width W required for the single path resulted in an interference with the other nearby obstacles. Thus, two thinner paths with smaller computed widths W are used.

Figure 7:
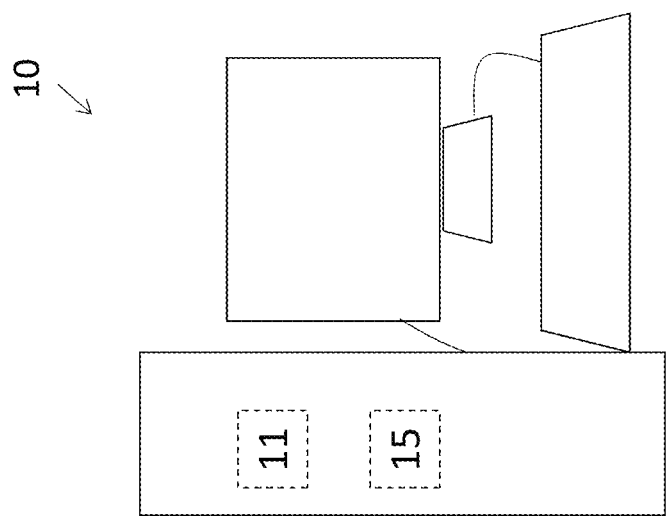
FIG. 7 is a block diagram of a system configured to automatically determine power plane shape in a printed circuit board according to one or more embodiments of the invention.

FIG. 7 is a block diagram of a system 10 that is configured to automatically determine power plane shape 250 in a PCB 100 according to one or more embodiments of the invention. The system 10 includes processing circuitry 11 and memory 15 that is used to store inputs, provided at block 310, for example, about the PCB 100. The system 10 performs the processes discussed with reference to FIGS. 3 and 4, for example, to generate sub-shapes 245 that are then combined into the power plane shape 250 according to one or more embodiments of the invention. The PCB 100 is fabricated with the power plane shape 250 determined by the system 10.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of automatically determining power plane shape in a printed circuit board (PCB), the method comprising:
    obtaining inputs at a processor, wherein the inputs include a size and shape of the PCB, a set of sources, and a set of sinks associated with a power plane;
    determining, using the processor, a center of charge (CoC) as a center of largest current density for the set of sources and the set of sinks;
    creating, using the processor, a sub-shape corresponding with a path from each source of the set of sources and from each sink of the set of sinks to the CoC, wherein the creating the sub-shape includes determining a width of a conductor in the path corresponding with each of the sub-shapes; and
    combining the sub-shapes created for the set of sources and the set of sinks as the power plane shape, wherein the obtaining the inputs includes obtaining a location of one or more obstacles, the one or more obstacles including a via, and the creating the sub-shape includes creating one or more obstacle avoidance points to avoid one or more of the one or more obstacles.

2. The computer-implemented method according to claim 1, wherein the one or more obstacles includes another component such as one of the set of sources or the set of sinks, a connector, a processor, or an integrated circuit, or a void.

3. The computer-implemented method according to claim 1, wherein the obtaining the inputs includes obtaining a thickness of the conductor used to create the path for each of the sub-shapes.

4. The computer-implemented method according to claim 3, wherein the determining the width of the conductor in the path corresponding with each of the sub-shapes includes calculating a resistance R of the path as:

$$R = \frac{Vdrop}{I},$$

where
    Vdrop is a maximum allowable voltage drop between one of the set of sources and a corresponding one of the set of sinks and I is a desired current to be transmitted via the sub-shape.

5. The computer-implemented method according to claim 4, wherein the determining the width W of the conductor in the path corresponding with each of the sub-shapes includes solving for the width W based on:

$$R = \rho \frac{L}{W*H},$$

where
    $\rho$ is a resistivity of the conductor, L is a length of the path, and H is the thickness of the conductor.

6. The computer-implemented method according to claim 1, wherein the combining the sub-shapes includes joining the sub-shapes at the CoC.

7. The computer-implemented method according to claim 1, wherein the combining the sub-shapes includes filling and smoothing overlap areas among the sub-shapes.

8. A system to automatically determine power plane shape in a printed circuit board (PCB), the system comprising:
    a memory device configured to store a size and shape of the PCB, a set of sources, and a set of sinks associated with a power plane; and
    a processor configured to determine a center of charge (CoC) as a center of largest current density for the set of sources and the set of sinks, to create a sub-shape corresponding with a path from each source of the set of sources and from each sink of the set of sinks to the CoC, wherein the creating the sub-shape includes determining a width of a conductor in the path corresponding with each of the sub-shapes, and to combine the sub-shapes created for the set of sources and the set of sinks as the power plane shape, wherein the processor is further configured to obtain a location of one or more obstacles, the one or more obstacles including a via, and to create the sub-shape by creating one or more obstacle avoidance points to avoid one or more of the one or more obstacles.

9. The system according to claim 8, wherein the one or more obstacles including another component such as one of the set of sources or the set of sinks, a connector, a processor, or an integrated circuit, or a void.

10. The system according to claim 8, wherein the processor is further configured to obtain a thickness of the conductor used to create the path for each of the sub-shapes.

11. The system according to claim 10, wherein the processor is configured to determine the width of the conductor in the path corresponding with each of the sub-shapes by calculating a resistance R of the path as:

$$R = \frac{Vdrop}{I},$$

where
    Vdrop is a maximum allowable voltage drop between one of the set of sources and a corresponding one of the set of sinks and I is a desired current to be transmitted via the sub-shape, and by solving for the width W based on:

$$R = \rho \frac{L}{W*H},$$

where

ρ is a resistivity of the conductor, L is a length of the path, and H is the thickness of the conductor.

12. The system according to claim 8, wherein the processor is configured to combine the sub-shapes by joining the sub-shapes at the CoC and filling and smoothing overlap areas among the sub-shapes.

13. A computer program product for automatically determining power plane shape in a printed circuit board (PCB), the computer program product comprising a computer readable storage medium having program instructions embodied therewith, the program instructions executable by a processor to perform a method comprising:

obtaining inputs, wherein the inputs include a size and shape of the PCB, a set of sources, and a set of sinks associated with a power plane;

determining a center of charge (CoC) as a center of largest current density for the set of sources and the set of sinks;

creating a sub-shape corresponding with a path from each source of the set of sources and from each sink of the set of sinks to the CoC, wherein the creating the sub-shape includes determining a width of a conductor in the path corresponding with each of the sub-shapes; and combining the sub-shapes created for the set of sources and the set of sinks as the power plane shape, wherein the obtaining the inputs includes obtaining a location of one or more obstacles, the one or more obstacles including a via, and the creating the sub-shape includes creating one or more obstacle avoidance points to avoid one or more of the one or more obstacles.

14. The computer program product according to claim 13, wherein the one or more obstacles includes another component such as one of the set of sources or the set of sinks, a connector, a processor, or an integrated circuit, or a void.

15. The computer program product according to claim 13, wherein the obtaining the inputs includes obtaining a thickness of the conductor used to create the path for each of the sub-shapes.

16. The computer program product according to claim 15, wherein the determining the width of the conductor in the path corresponding with each of the sub-shapes includes calculating a resistance R of the path as:

$$R = \frac{Vdrop}{I},$$

where
Vdrop is a maximum allowable voltage drop between one of the set of sources and a corresponding one of the set of sinks and I is a desired current to be transmitted via the sub-shape.

17. The computer program product according to claim 16, wherein the determining the width W of the conductor in the path corresponding with each of the sub-shapes includes solving for the width W based on:

$$R = \rho \frac{L}{W*H},$$

where
ρ is a resistivity of the conductor, L is a length of the path, and H is the thickness of the conductor.

18. The computer program product according to claim 13, wherein the combining the sub-shapes includes joining the sub-shapes at the CoC.

19. The computer program product according to claim 13, wherein the combining the sub-shapes includes filling and smoothing overlap areas among the sub-shapes.

* * * * *